(12) United States Patent
Koyanagi

(10) Patent No.: US 11,184,495 B2
(45) Date of Patent: Nov. 23, 2021

(54) IMAGE READING APPARATUS

(71) Applicant: SEIKO EPSON CORPORATION, Tokyo (JP)

(72) Inventor: Noriyuki Koyanagi, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/879,994

(22) Filed: May 21, 2020

(65) Prior Publication Data

US 2020/0374413 A1   Nov. 26, 2020

(30) Foreign Application Priority Data

May 24, 2019   (JP) .............................. JP2019-097495

(51) Int. Cl.
   *H04N 1/00*   (2006.01)
   *H04N 1/12*   (2006.01)

(52) U.S. Cl.
   CPC ..... *H04N 1/00602* (2013.01); *H04N 1/00013* (2013.01); *H04N 1/00795* (2013.01); *H04N 1/121* (2013.01)

(58) Field of Classification Search
   CPC ........... H04N 1/00602; H04N 1/00013; H04N 1/00795; H04N 1/121; H04N 1/00557; H04N 1/00559; H04N 1/00519; H04N 1/0057; H04N 1/00525; B65H 2601/523; B65H 2801/39; B65H 5/06; B65H 3/06
   USPC ....................................................... 358/498
   See application file for complete search history.

(56) References Cited

U.S. PATENT DOCUMENTS

| | | | | |
|---|---|---|---|---|
| 5,673,124 | A * | 9/1997 | Kaji ................... | H04N 1/00236 358/1.14 |
| 6,085,063 | A * | 7/2000 | Morita ............... | H04N 1/00631 355/40 |
| 7,860,446 | B2 * | 12/2010 | Nakamura ......... | H04N 1/00567 399/372 |
| 2003/0081269 | A1 * | 5/2003 | Aoyama ............. | H04N 1/0057 358/474 |
| 2005/0052481 | A1 * | 3/2005 | Takahashi ......... | B41J 25/308 347/8 |
| 2006/0026306 | A1 * | 2/2006 | Kasamatsu ........ | H04N 1/00888 710/10 |

(Continued)

FOREIGN PATENT DOCUMENTS

| | | |
|---|---|---|
| EP | 3618412 | 4/2020 |
| JP | 5124674 | 1/2013 |
| JP | 2019-012878 | 1/2019 |

*Primary Examiner* — Negussie Worku
(74) *Attorney, Agent, or Firm* — Workman Nydegger

(57) ABSTRACT

An image reading apparatus includes a document transport path along which a document is transported, a feeding roller that is provided on the document transport path and that feeds the document, and a reader that is provided downstream of the feeding roller in the document transport path and that reads the document, in which a main board on which electronic components are mounted, when viewed from a width direction, which is a direction intersecting a document transport direction, is disposed in a region between the document transport path and a feeding roller tangent line, which is a straight line parallel to the document transport path and which is in contact with the feeding roller at a position separated from the document transport path. In addition, the main board may be provided in an orientation along the document transport path.

16 Claims, 8 Drawing Sheets

(56) References Cited

U.S. PATENT DOCUMENTS

| | | | |
|---|---|---|---|
| 2006/0246866 A1* | 11/2006 | Nakagawa | H04N 1/00281 |
| | | | 455/301 |
| 2017/0126920 A1* | 5/2017 | Tsukamoto | B41J 29/393 |
| 2017/0139369 A1* | 5/2017 | Matsuno | H04N 1/00551 |
| 2018/0009613 A1* | 1/2018 | Kawanishi | H04N 1/00583 |
| 2018/0357342 A1* | 12/2018 | Iwai | G06F 30/20 |
| 2019/0114185 A1* | 4/2019 | Nakajima | G06F 3/1205 |
| 2020/0076974 A1 | 3/2020 | Koyanagi et al. | |

* cited by examiner

IMAGE READING APPARATUS

The present application is based on, and claims priority from JP Application Serial Number 2019-097495, filed May 24, 2019, the disclosure of which is hereby incorporated by reference herein in its entirety.

BACKGROUND

1. Technical Field

The present disclosure relates to an image reading apparatus that reads a document image.

2. Related Art

Hereinafter, a scanner, which is an example of the image reading apparatus, will be described as an example. Some scanners are provided with a document feeding mechanism that automatically feeds a document and are configured to automatically feed and read a plurality of documents.

The document feeding mechanism includes a document tray on which a plurality of documents are placed, a feeding roller that feeds documents from the document tray by rotating in contact with the documents set in the document tray, and a separator that separates the documents in contact with the feeding roller. An example of an image reading apparatus provided with such a document feeding mechanism is disclosed in JP-A-2019-012878.

Image reading apparatuses usually have a main board that is provided with electronic components. Although this main board is a part that is of a type that occupies a large region in the image reading apparatus and may cause an increase in the size of the apparatus, in existing image reading apparatuses such as the image reading apparatus described in JP-A-2019-012878, there has been room to improve the arrangement of the main board from the viewpoint of suppressing an increase in the size of the apparatus.

SUMMARY

According to an aspect of the present disclosure, an image reading apparatus includes a document transport path along which a document is transported; a feeding roller that is provided on the document transport path and that feeds the document, and a reader that is provided downstream of the feeding roller in the document transport path and that reads the document, in which a main board on which electronic components are mounted, when viewed from a width direction, which is a direction intersecting a document transport direction, is disposed in a region between the document transport path and a feeding roller tangent line, which is a straight line parallel to the document transport path and which is in contact with the feeding roller at a position separated from the document transport path.

DESCRIPTION OF EXEMPLARY EMBODIMENTS

Figure 1:
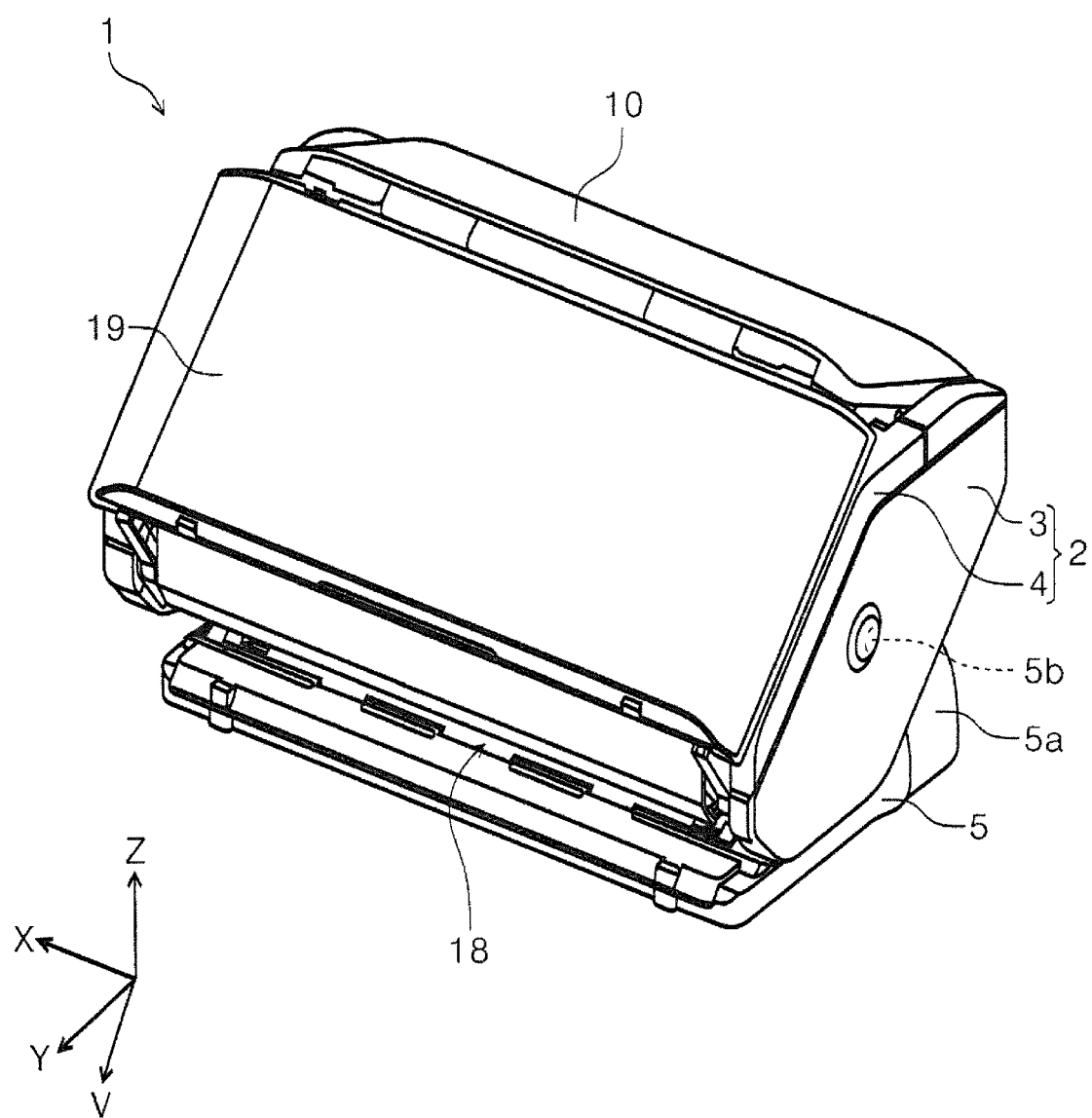
FIG. 1 is an external perspective view of a scanner with a front surface cover and an upper surface cover closed, when viewed from a front surface side.

Hereinafter, the present disclosure will be schematically described.

An image reading apparatus according to a first aspect includes a document transport path along which a document is transported, a feeding roller that is provided on the document transport path and that feeds the document, and a reader that is provided downstream of the feeding roller in the document transport path and that reads the document, in which a main board on which electronic components are mounted, when viewed from a width direction, which is a direction intersecting a document transport direction, is disposed in a region between the document transport path and a feeding roller tangent line, which is a straight line parallel to the document transport path and which is in contact with the feeding roller at a position separated from the document transport path.

According to this aspect, because the main board on which electronic components are mounted, when viewed from the width direction, which is a direction intersecting the document transport direction, is disposed within a region between the document transport path and a feeding roller tangent line, which is a straight line parallel to the document transport path and which is in contact with the feeding roller at a position separated from the document transport path, the size of the apparatus in the direction intersecting the document transport path can be reduced.

In a second aspect according to the first aspect, the main board is provided in an orientation along the document transport path.

According to this aspect, because the main board is provided in an orientation along the document transport path, the size of the apparatus in the direction intersecting the document transport path can be more effectively reduced.

In a third aspect according to the first or second aspect, the image reading apparatus further includes a feeding-roller drive motor that is a power source of the feeding roller, and, when viewed from the width direction, the feeding roller tangent line intersects the feeding-roller drive motor.

According to this aspect, because the image reading apparatus further includes a feeding-roller drive motor that is a power source of the feeding roller, and, when viewed from the width direction, the feeding roller tangent line intersects the feeding-roller drive motor, in the configuration including the feeding-roller drive motor, an increase in the size of the apparatus can be suppressed.

In a fourth aspect according to any one of the first to third aspects, the image reading apparatus further includes a first transfer roller pair that transfers the document fed by the feeding roller to a position facing the reader, a second transfer roller pair that is provided downstream of the reader in the document transport path and that transfers the document downstream along the document transport path, and a transfer-roller-pair drive motor that is a power source of the first transfer roller pair and the second transfer roller pair, in which, when viewed from the width direction, the feeding roller tangent line intersects the transfer-roller-pair drive motor.

According to this aspect, because the feeding roller tangent line, when viewed from the width direction, intersects the transfer-roller-pair drive motor, in the configuration including the transfer-roller-pair drive motor, an increase in the size of the apparatus can be suppressed.

In a fifth aspect according to the fourth aspect, the main board and the electronic components, when viewed from the width direction, are located in a region interposed between a first motor tangent line, which is a straight line parallel to the document transport path and which is in contact with the transfer-roller-pair drive motor, and a second motor tangent line, which is a straight line parallel to the document transport path and which is in contact with the transfer-roller-pair drive motor at a position farther from the document transport path than the first motor tangent line.

According to this aspect, because the main board and the electronic components mounted on the main board, when viewed from the width direction, are located in a region interposed between the first motor tangent line and the second motor tangent line, the size of the apparatus in the direction intersecting the document transport path can be reduced.

In a sixth aspect according to the fifth aspect, the feeding-roller drive motor, when viewed from the width direction, is located in the region interposed between the first motor tangent line and the second motor tangent line.

According to this aspect, because the feeding-roller drive motor, when viewed from the width direction, is located in the region interposed between the first motor tangent line and the second motor tangent line, the size of the apparatus in the direction intersecting the document transport path can be reduced.

In a seventh aspect according to the sixth aspect, the image reading apparatus further includes a background plate that is provided at a position facing the reader and that is configured to switch between a facing state of facing the reader and a non-facing state of not facing the reader, and a background-plate drive motor that is a power source that switches the state of the background plate, in which the background-plate drive motor, when viewed from the width direction, is located in the region interposed between the first motor tangent line and the second motor tangent line.

According to this aspect, because the background-plate drive motor is located in the region interposed between the first motor tangent line and the second motor tangent line, the size of the apparatus in the direction intersecting the document transport path can be reduced.

In an eighth aspect according to any one of the first to fourth aspects, the document transport path is formed between a first unit, which includes the feeding roller and the main board, and a second unit, which is disposed so as to face the first unit, the first unit is pivotally supported by a support portion located below the first unit when viewed from the width direction, a casing, which forms an outer shell of the first unit, includes an arch portion along a pivot locus of the first unit at a position facing the support portion, and the main board is disposed in a space formed inside the arch portion.

According to this aspect, because the first unit is pivotally supported by the support portion, the orientation of the apparatus can be changed, and usability can be improved.

Because the casing forming the outer shell of the first unit includes the arch portion along the pivot locus of the first unit at a position facing the support portion and the main board is disposed in a space formed inside the arch portion, the size of the apparatus can be reduced by effectively utilizing the space in the casing.

In a ninth aspect according to the eighth aspect, the main board is configured such that an electronic component having the largest amount of protrusion among the electronic components protruding in the direction intersecting the document transport path is disposed so as to face the arch portion.

According to this aspect, because the main board is configured such that the electronic component having the largest amount of protrusion among the electronic components protruding in the direction intersecting the document transport path is disposed so as to face the arch portion, the size of the apparatus can be reduced by effectively utilizing the space in the casing.

In a tenth aspect according to any one of the first to ninth aspects, the image reading apparatus further includes a separation roller that performs nipping and separation of the document between the separation roller and the feeding roller, and a separation-roller drive motor, which is a power source of the separation roller, in which, when viewed from the width direction, a separation roller tangent line, which is a straight line parallel to the document transport path and which is in contact with the separation roller at a position separated from the document transport path, intersects the separation-roller drive motor.

According to this aspect, in the configuration including the separation roller and the separation-roller drive motor, because the separation roller tangent line intersects the separation-roller drive motor, the size of the apparatus in the direction intersecting the document transport path can be reduced.

Hereinafter, the present disclosure will be specifically described.

As an example of the image reading apparatus, a scanner 1 configured to read at least one surface among a front surface and a rear surface of a document will be exemplified. The scanner 1 is a so-called document scanner that performs reading while moving a document with respect to a reader.

Further, in the XYZ coordinate system illustrated in each drawing, the X-axis direction is an apparatus width direction and a document width direction. The Y-axis direction is an apparatus depth direction, and is a direction along a horizontal direction. The Z-axis direction is a direction along a vertical direction. In addition, the V-axis direction is a direction parallel to a document transport path T described later.

In the present embodiment, the +Y direction is a direction from an apparatus rear surface to an apparatus front surface, and the −Y direction is a direction from the apparatus front surface to the apparatus rear surface. In addition, when viewed from the apparatus front surface, the left is defined as the +X direction and the right is defined as the −X direction.

In addition, hereinafter, the direction in which the document is transported (+V direction) may be referred to as "downstream", and the opposite direction (−V direction) may be referred to as "upstream".

Figure 5:
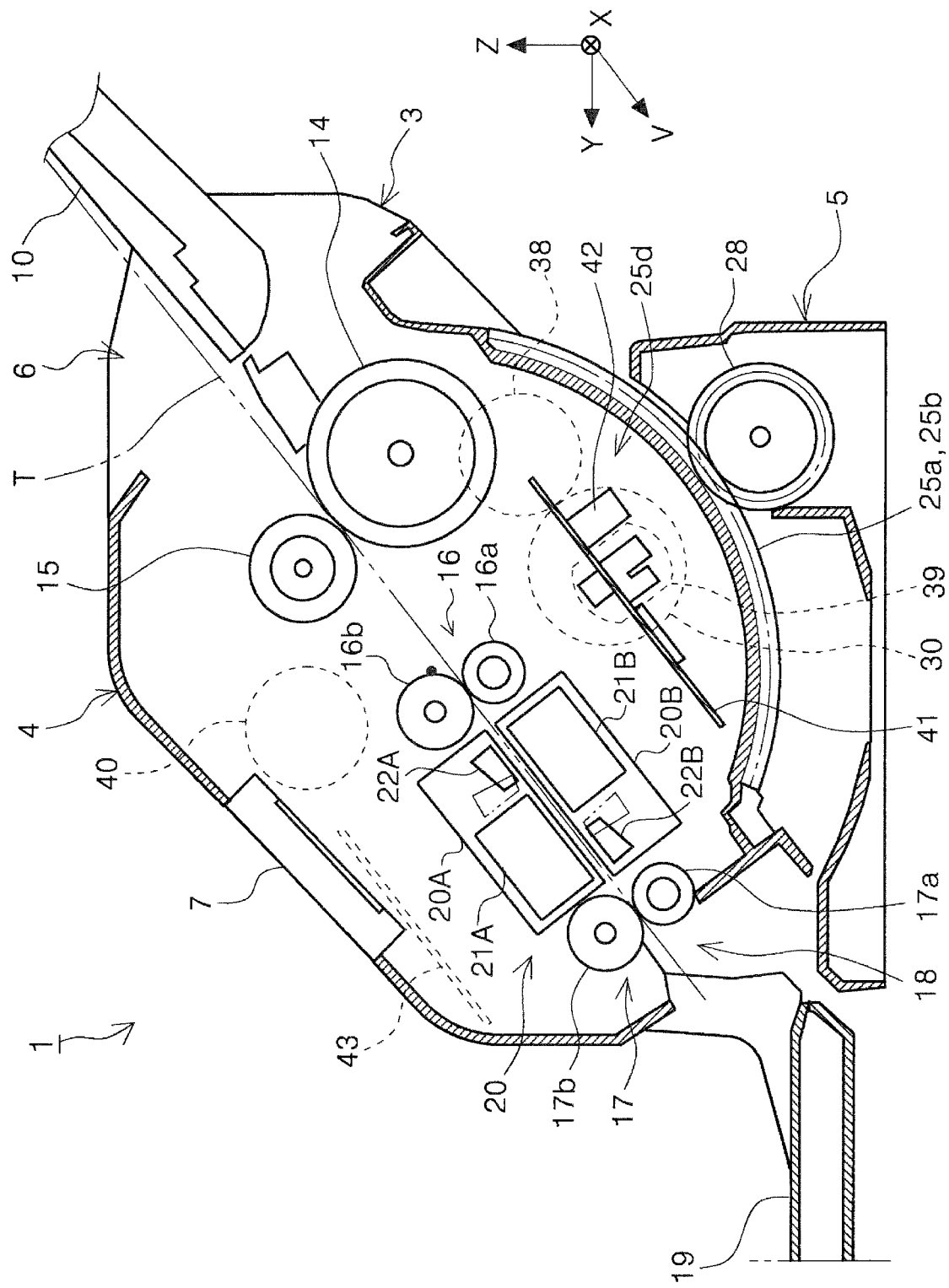
FIG. 5 is a sectional view of the document transport path of the scanner with the front surface cover and the upper surface cover opened, when viewed from the width direction.

The scanner 1 has a document transport path T along which a document is transported, which is indicated by a two-dot chain line in FIG. 5. The document transport path T is, in other words, a path through which the document passes. The document transport path T is a substantially straight document transport path formed between a lower unit 3 as a first unit and an upper unit 4 as a second unit, which are described later.

In FIGS. 1 to 4, the scanner 1 includes an apparatus main body 2 and a support base 5 that pivotally supports the apparatus main body 2.

The apparatus main body 2 includes the lower unit 3 as the first unit and the upper unit 4 as the second unit.

The upper unit 4 is provided so as to open and close by pivoting with respect to the lower unit 3 about a pivot shaft (not illustrated), and the document transport path T can be exposed by opening the upper unit 4 to the front of the apparatus.

The lower unit 3 forming the apparatus main body 2 is provided so as to pivot via a pivot shaft 5b with respect to an arm portion 5a forming the support base 5, and is configured to change orientation by pivoting.

Figure 4:
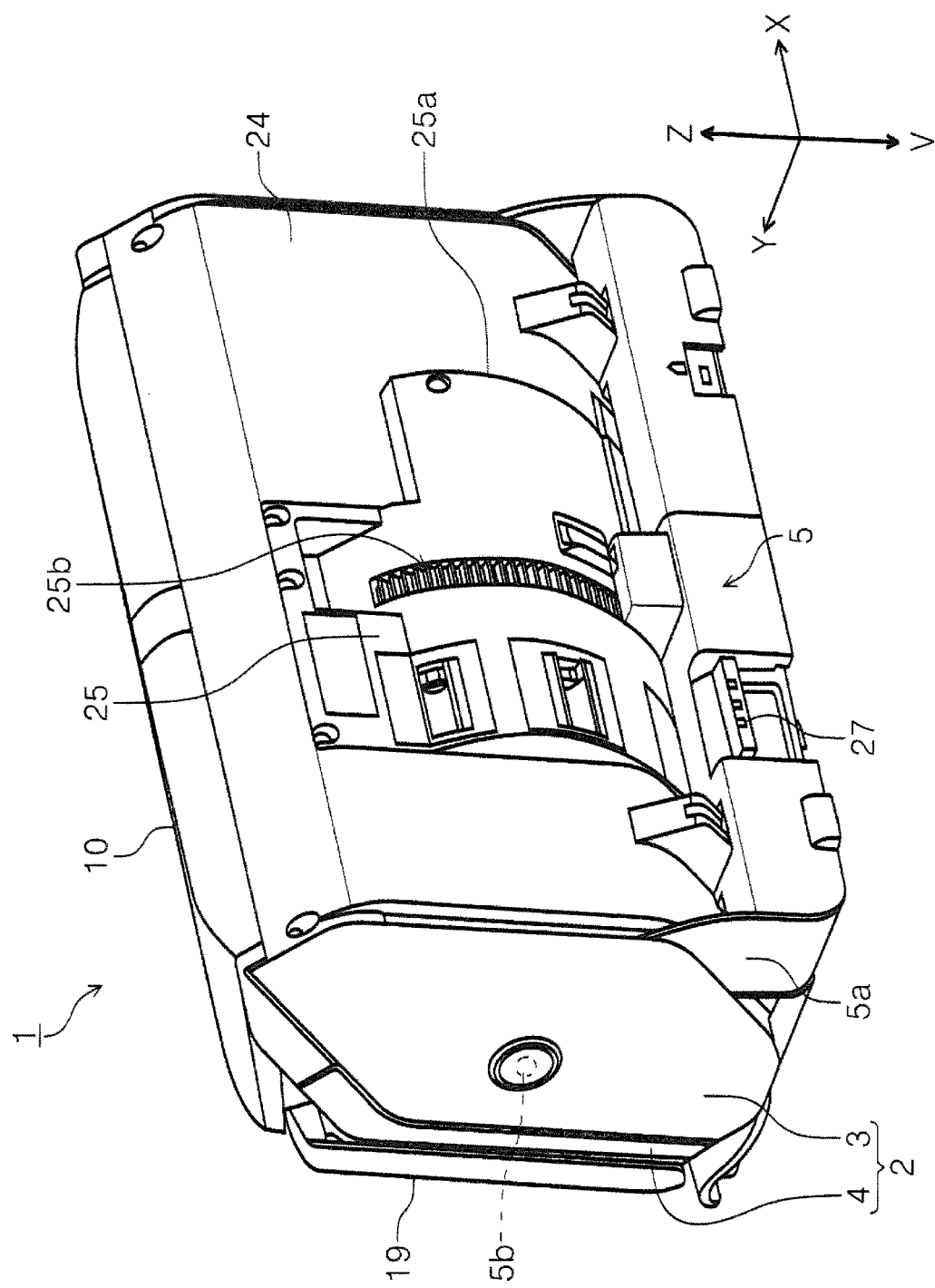
FIG. 4 is an external perspective view of the scanner with the front surface cover and the upper surface cover closed, when viewed from a rear surface side.

As illustrated in FIG. 4, the lower unit 3 has an outer shell formed of a first casing 24 and a second casing 25, and the second casing 25 has an arch portion 25a having a shape along the pivot locus of the lower unit 3. A rack portion 25b is formed in the arch portion 25a, and the rack portion 25b meshes with a pinion gear 28 provided on the support base 5 as illustrated in FIG. 5.

A rotational load is applied to the pinion gear 28 by a damper mechanism (not illustrated), so that the pivot speed of the lower unit 3 when pivoting is attenuated.

Figure 2:
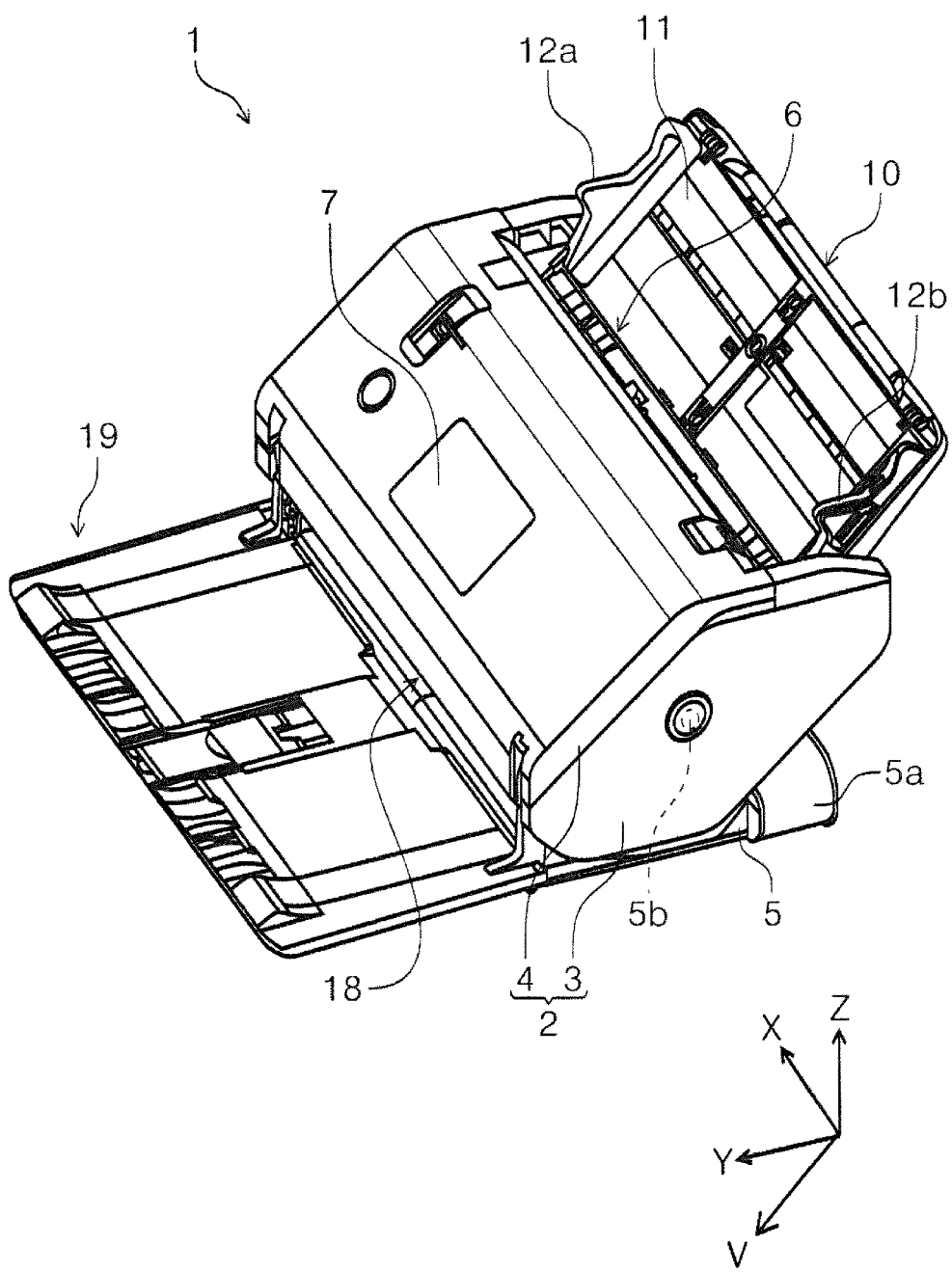
FIG. 2 is an external perspective view of the scanner with the front surface cover and the upper surface cover opened, when viewed from the front surface side.
Figure 3:
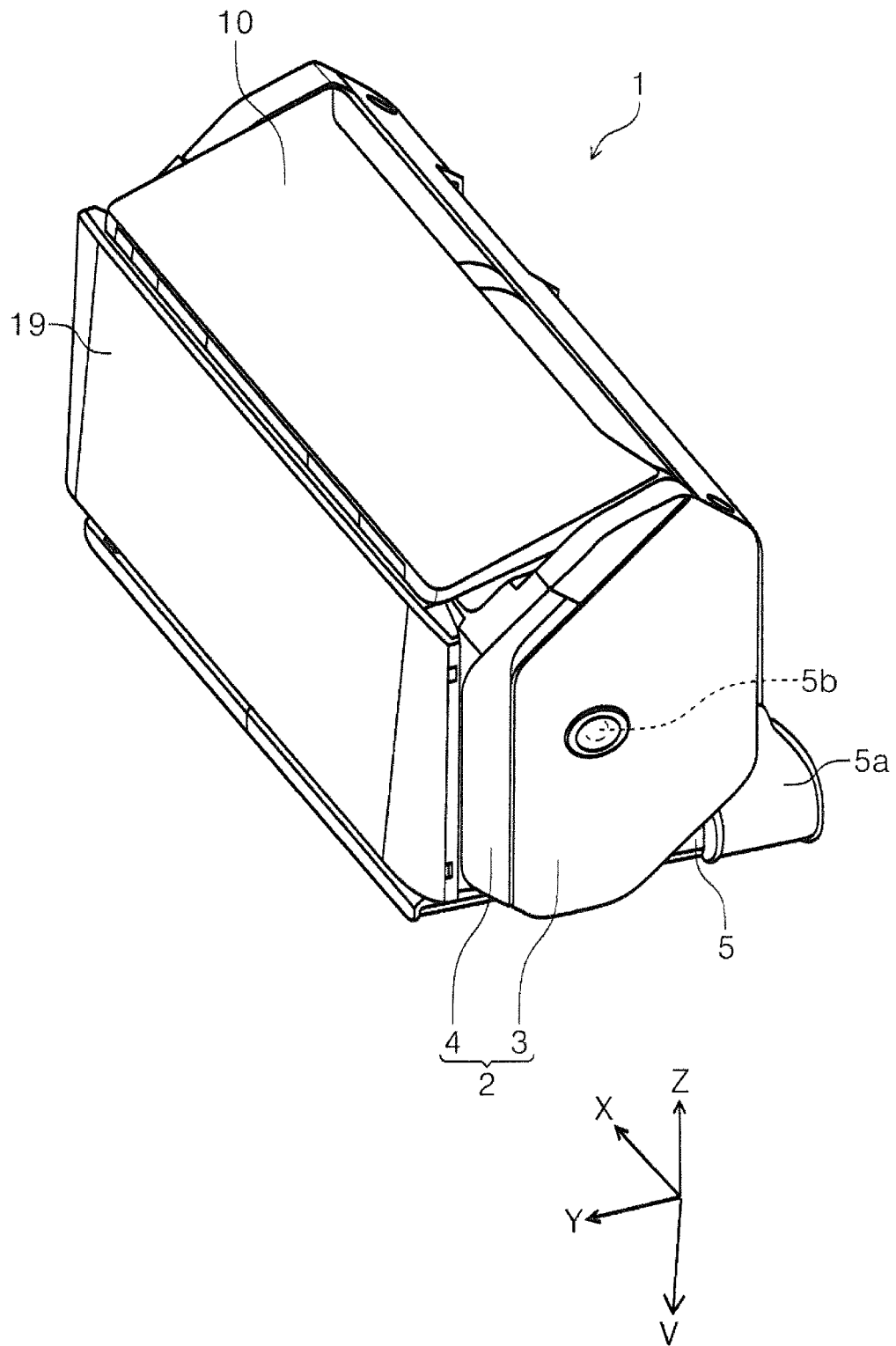
FIG. 3 is an external perspective view of the scanner with the front surface cover and the upper surface cover closed, when viewed from the front surface side.

The scanner 1 according to the present embodiment is configured to hold three orientations with an orientation holder (not illustrated), and two of the three orientations are orientations at the time of document reading, and the other one is an orientation at the time of non-use. The orientation illustrated in FIGS. 1 and 2 is one of the orientations at the time of document reading, and the orientation illustrated in FIGS. 3 and 4 is the orientation at the time of non-use. In the orientation at the time of non-use, the projected region of the scanner 1 on the installation surface is the smallest, and more specifically, the orientation at the time of non-use is an orientation in which the occupied space in the Y-axis direction is minimized. The document transport path T is closest to vertical in the orientation at the time of non-use illustrated in FIGS. 3 and 4.

Further, in FIG. 4, reference sign 27 denotes an operation lever for releasing the orientation holding state of the scanner 1 caused by the orientation holder (not illustrated).

Hereinafter, a detailed configuration of the scanner 1 will be further described. The upper unit 4 has a front surface cover 19, and the lower unit 3 has an upper surface cover 10. The front surface cover 19 is provided so as to pivot with respect to the upper unit 4, and, by pivoting, can take a closed state as illustrated in FIGS. 1, 3 and 4, and can take an open state as illustrated in FIGS. 2 and 5. When opened, the front surface cover 19 functions as a document receiving tray for receiving documents to be read and then discharged as illustrated in FIGS. 2 and 5.

The upper unit 4 includes, on an upper surface, an operation panel 7 on which various reading settings and reading execution operations are performed as illustrated in FIG. 2 and with which a user interface (UI) that displays the contents of the reading settings and the like is realized. In the present embodiment, the operation panel 7 is a so-called touch panel through which both display and input can be performed, and serves as an operation portion for performing various operations and a display portion for displaying various information. The operation panel 7 is exposed by opening the front surface cover 19.

The upper surface cover 10 provided on the lower unit 3 is provided so as to pivot with respect to the lower unit 3, and, by pivoting, can take a closed state illustrated in FIGS. 1, 3 and 4, and an open state illustrated in FIGS. 2 and 5. When opened, the upper surface cover 10 functions as a document supporting tray that supports a document to be fed as illustrated in FIGS. 2 and 5. In FIG. 2, reference signs 12a and 12b denote edge guides that guide the side edges of the document.

At an upper portion of the apparatus main body 2, there is provided a feeding port 6, which is continuous with the inside of the apparatus main body 2, and a document placed on the upper surface cover 10 is sent from the feeding port 6 toward the inside of the apparatus main body 2.

Next, the document transport path T in the scanner 1 will be described mainly with reference to FIG. 5.

The upper surface cover 10 described above is provided most upstream of the document transport path T, and, downstream of the upper surface cover 10, there is provided a feeding roller 14 that feeds a document placed on the upper surface cover 10 downstream, and a separation roller 15 that nips and separates the document between the separation roller 15 and the feeding roller 14. The feeding roller 14 is in contact with the lowest document among the documents placed on the upper surface cover 10. Therefore, when a plurality of documents are placed on the upper surface cover 10, the documents are fed downstream in order from the lowest document.

The feeding roller 14 is driven to rotate by a feeding-roller drive motor 38. With the rotation torque obtained from the feeding-roller drive motor 38, the feeding roller 14 rotates counterclockwise in FIG. 5.

Rotational torque that rotates in a counterclockwise direction in FIG. 5 is transmitted to the separation roller 15 from a separation-roller drive motor 40 via a torque limiter (not illustrated).

When no document is interposed between the feeding roller 14 and the separation roller 15, or when only one sheet is interposed, the separation roller 15 is driven to rotate clockwise in FIG. 5 by rotation of the feeding roller 14 irrespective of the rotation torque received from the separation-roller drive motor 40 due to the occurrence of slipping of the torque limiter (not illustrated).

When second and subsequent documents enter between the feeding roller 14 and the separation roller 15 in addition to the document to be fed, because of the occurrence of slippage between the documents, the separation roller 15 is caused to rotate counterclockwise in FIG. 5 by the rotational torque received from the separation-roller drive motor 40. As a result, double feeding of documents is prevented.

A transport roller pair 16 as a first transfer roller pair, a reading portion 20 as a reader that reads a document image, and a discharge roller pair 17 as a second transfer roller pair are provided downstream of the feeding roller 14. The transport roller pair 16 includes a transport drive roller 16a that is driven to rotate by a transfer-roller-pair drive motor 30, and a transport driven roller 16b that is driven and rotated.

The document nipped by the feeding roller 14 and the separation roller 15 and fed downstream is nipped by the transport roller pair 16, and is transported to a position facing an upper sensor unit 20A and a lower sensor unit 20B located downstream of the transport roller pair 16.

The reading portion 20 includes the upper sensor unit 20A located above the document transport path T and provided in the upper unit 4 and the lower sensor unit 20B located below the document transport path T and provided in the lower unit 3. The upper sensor unit 20A has a sensor module 21A, and the lower sensor unit 20B has a sensor module 21B. In the present embodiment, the sensor modules 21A and 21B are contact-type image sensor modules (CISM).

An upper surface of the document is read by the sensor module 21A located above the document transport path T, and a lower surface of the document is read by the sensor module 21B located below the document transport path T.

Further, a document reading surface (not illustrated) of the upper sensor unit 20A and a document reading surface (not illustrated) of the lower sensor unit 20B are parallel to the document transport path T.

The upper sensor unit 20A includes a background plate 22A at a position facing the sensor module 21B of the lower sensor unit 20B, and the lower sensor unit 20B includes a background plate 22B at a position facing the sensor module 21A of the upper sensor unit 20A.

The background plates 22A and 22B are reference plates that are read by the opposing sensor modules for shading correction; for example, a resin plate of white, gray, black or the like, or a metal plate or the like painted white, gray, black, or the like can be used.

The background plates 22A and 22B are provided so as to pivot by the power of a background-plate drive motor 39, and by pivoting, it is possible to switch between a facing state in which the background plates 22A and 22B face the opposing sensor modules as illustrated by a solid line and a non-facing state in which the facing state is cancelled as illustrated by a two-dot chain line. The background plates 22A and 22B are, for example, white, and, in the facing state, a white reference value can be obtained, and in the non-facing state, a black reference value can be obtained.

After an image on at least one of the upper surface and lower surface of the document is read by the reading portion 20, the document is nipped by the discharge roller pair 17, which is located downstream of the reading portion 20, and is discharged from a discharge port 18.

The discharge roller pair 17 includes a discharge drive roller 17a that is driven to rotate by the transfer-roller-pair drive motor 30, and a discharge driven roller 17b that is driven and rotated.

Figure 6:
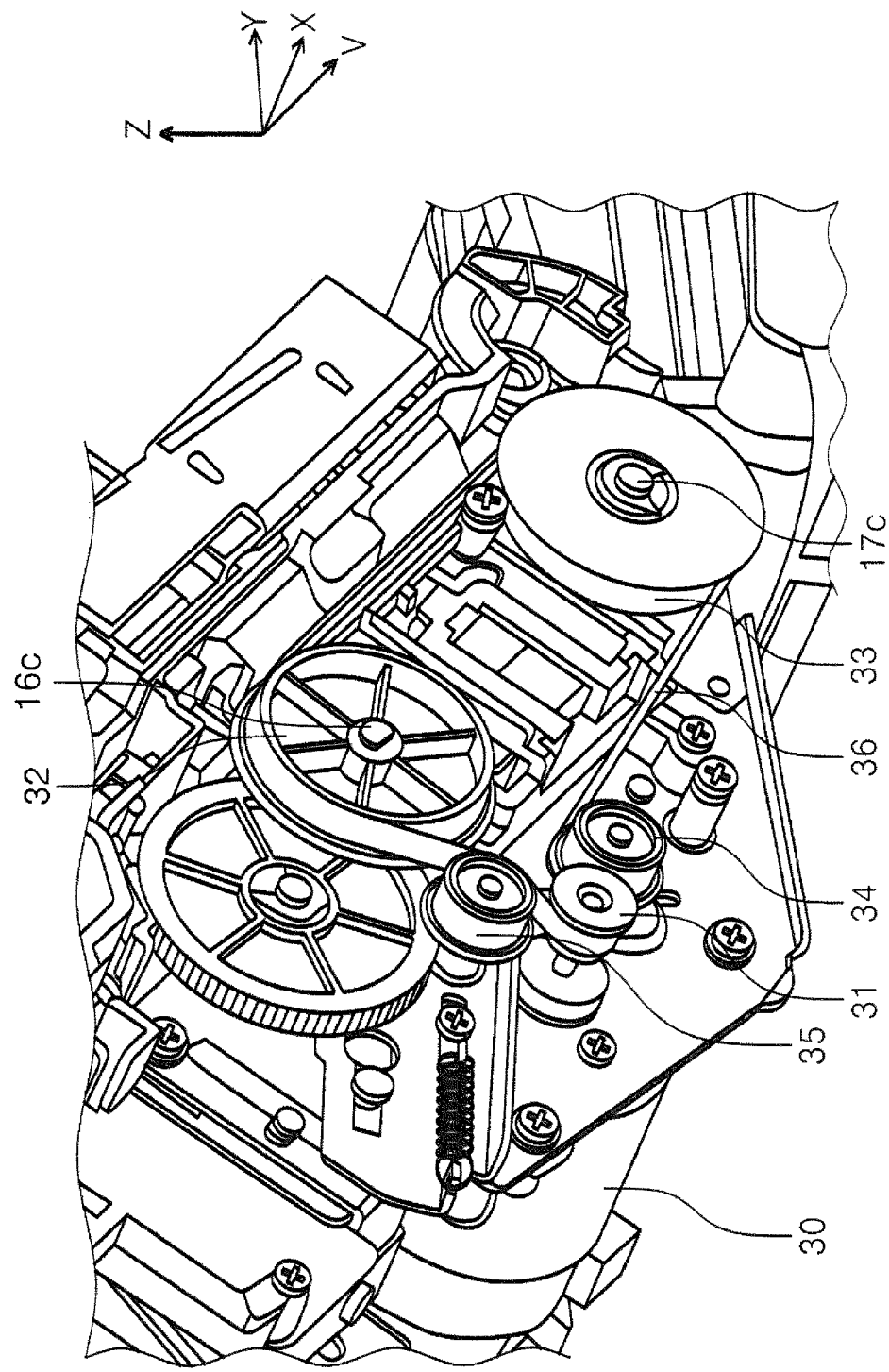
FIG. 6 is a perspective view of a transmitter that transmits a driving force from a transfer-roller-pair drive motor to a drive roller shaft.

Driving force is transmitted from the transfer-roller-pair drive motor 30 to the transport drive roller 16a and the discharge drive roller 17a by a driving force transmitter illustrated in FIG. 6. In FIG. 6, reference sign 16c denotes a drive roller shaft to which the transport drive roller 16a is attached, and reference sign 17c denotes a drive roller shaft to which the discharge drive roller 17a is attached.

A drive pulley 31 is attached to an output shaft of the transfer-roller-pair drive motor 30, a driven pulley 32 is attached to a shaft end of the drive roller shaft 16c, and a driven pulley 33 is attached to a shaft end of the drive roller shaft 17c. In addition, a driven pulley 34 is provided near the drive pulley 31. A drive belt 36 is wound around the drive pulley 31, the driven pulley 32, the driven pulley 33, and the driven pulley 34, and the drive force of the transfer-roller-pair drive motor 30 is transmitted to the drive roller shafts 16c and 17c via the drive belt 36.

Further, reference sign 35 denotes a tension applying pulley that applies tension to the drive belt 36.

As described above, because the driving force of the transfer-roller-pair drive motor 30 is transmitted to the drive roller shafts 16c and 17c via the drive belt 36, for example, noise can be reduced compared with a configuration in which the driving force is transmitted via gears. In addition, because the transport drive roller 16a and the discharge drive roller 17a are driven by one drive belt 36, transport disturbance when the trailing edge of the document passes through the transport roller pair 16 can be suppressed, and an appropriate read image can be obtained.

Subsequently, the arrangement of a main board 41 and the like will be described with reference to FIG. 5, FIG. 7, and FIG. 8.

The scanner 1 according to the present embodiment includes the main board 41 on which electronic components are mounted. The main board 41 forms a controller that performs various controls of the scanner 1. As illustrated in FIG. 8, the main board 41, when viewed from a width direction, which is a direction intersecting the X-axis direction, that is, a document transport direction, is disposed in a region between the document transport path T and a feeding roller tangent line L2, which is a straight line parallel to the document transport path T and which is in contact with the feeding roller 14 at a position separated from the document feed path T.

Although the main board 41 is a part that is of a type that occupies a large region in the scanner 1, and may cause an increase in the size of the apparatus, as described above, because the main board 41 is disposed in the region between the document transport path T and the feeding roller tangent line L2 that is in contact with the feeding roller 14, it is possible to reduce the size of the apparatus in a direction intersecting the document transport path T, more specifically, in a direction perpendicular to the document transport path T.

Figure 8:
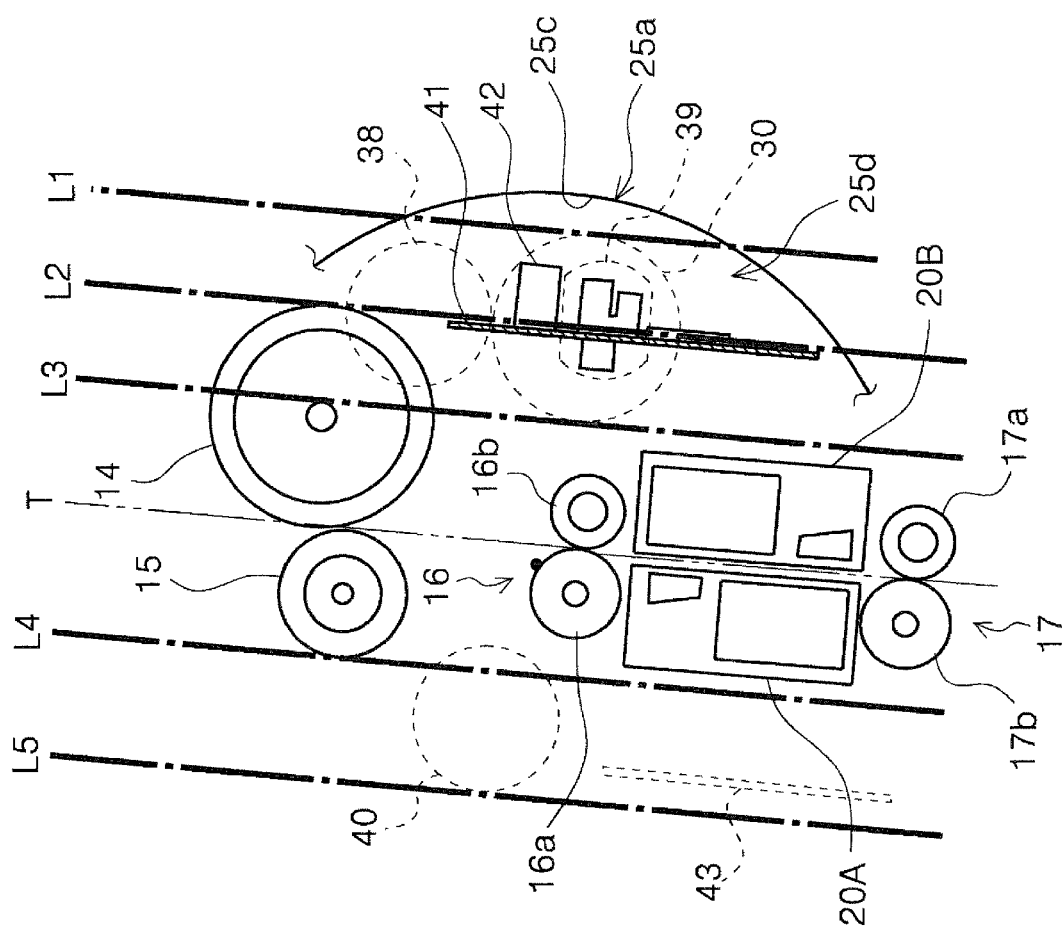
FIG. 8 is a view of the main board and the other components, when viewed from the width direction.

In particular, FIG. 8 illustrates a state where the scanner 1 is not in use, and because the document transport path T is closest to the vertical when the scanner 1 is not being used, by disposing the main board 41 in the region between the document transport path T and the feeding roller tangent line L2 as described above, the size of the apparatus in the Y-axis direction when not in use can be effectively suppressed, and the space occupied by the apparatus in the Y-axis direction when not in use can be effectively reduced.

Further, the main board 41, when viewed from the width direction, is not limited to a form that completely fits in the region between the document transport path T and the feeding roller tangent line L2 and may intersect both the document transport path T and the feeding roller tangent line L2, or may intersect only one of them.

In addition, because the main board 41, when viewed from the width direction, is provided in an orientation along the document transport path T, the size of the apparatus in the direction intersecting the document transport path T can be more effectively suppressed.

In addition, when viewed from the width direction, because the feeding roller tangent line L2 intersects the feeding-roller drive motor 38, in the configuration including the feeding-roller drive motor 38, an increase in the size of the apparatus can be suppressed.

In addition, when viewed from the width direction, because the feeding roller tangent line L2 intersects the transfer-roller-pair drive motor 30, in the configuration including the transfer-roller-pair drive motor 30, an increase in the size of the apparatus can be suppressed.

In addition, in the present embodiment, the main board 41 and the electronic components mounted on the main board 41, when viewed from the width direction, are located in a region interposed between a first motor tangent line L3, which is a straight line parallel to the document transport path T and which is in contact with the transfer-roller-pair drive motor 30, and a second motor tangent line L1, which is a straight line parallel to the document transport path T and which is in contact with the transfer-roller-pair drive motor 30 at a position farther from the document transport path T than the first motor tangent line L3. Reference sign 42 denotes an electronic component having the largest amount of protrusion from the main board 41 among the electronic components mounted on the main board 41.

Thus, because the main board 41 and the electronic components mounted on the main board 41, when viewed from the width direction, are located in a region interposed between the first motor tangent line L3 and the second motor tangent line L1, the size of the apparatus in the direction intersecting the document transport path T can be reduced.

However, the electronic component 42, when viewed from the width direction, may be disposed so as to intersect the second motor tangent line L1.

In addition, in the present embodiment, because the feeding-roller drive motor 38, when viewed from the width direction, is located in a region interposed between the first motor tangent line L3 and the second motor tangent line L1, this also makes it possible to reduce the size of the apparatus in the direction intersecting the document transport path T.

In addition, in the present embodiment, because the background-plate drive motor 39, when viewed from the width direction, is located in a region interposed between the first motor tangent line L3 and the second motor tangent line L1, this also makes it possible to reduce the size of the apparatus in the direction intersecting the document transport path T.

In addition, in the present embodiment, because the feeding-roller drive motor 38 and the background-plate drive motor 39, when viewed from the width direction, are located in the region occupied by the transfer-roller-pair drive motor 30 in the direction intersecting the document transport path T, and, furthermore, the main board 41 is located in the region occupied by the background-plate drive motor 39, this also makes it possible to reduce the size of the apparatus in the direction intersecting the document transport path T.

In addition, in the present embodiment, the second casing 25 (refer to FIG. 4) forming the outer shell of the lower unit 3 is provided with the arch portion 25*a* along the pivot locus of the lower unit 3 at a position facing the support base 5, and the main board 41 is placed in a space 25*d* formed inside the arch portion 25*a*. As a result, the space in the casing can be effectively used, and an increase in the size of the apparatus can be suppressed.

In particular, because, in the main board 41, the electronic component 42 having the largest amount of protrusion among the electronic components protruding in the direction intersecting the document transport path T is disposed so as to face the arch portion 25*a*, an increase in the size of the apparatus can be suppressed by effectively utilizing the space in the casing.

In addition, in the present embodiment, when viewed from the width direction, because a separation roller tangent line L4, which is a straight line parallel to the document transport path T and which is in contact with the separation roller 15 at a position separated from the document transport path T, intersects the separation-roller drive motor 40, the size of the apparatus in the direction intersecting the document transport path T can be reduced.

Figure 7:
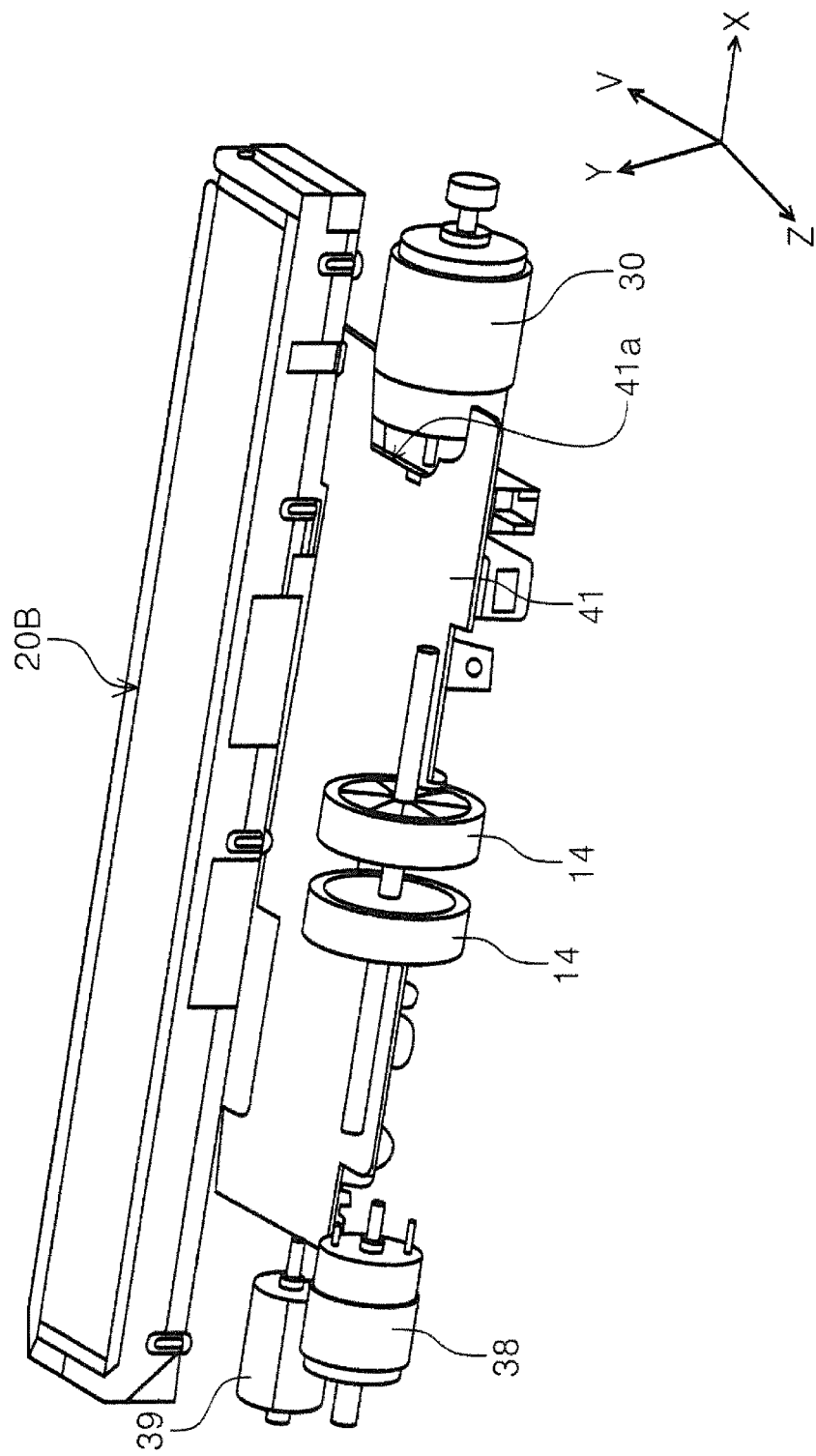
FIG. 7 is a perspective view of a main board and other components.

Further, a cutout 41*a* is formed in the main board 41 as illustrated in FIG. 7, and the transfer-roller-pair drive motor 30 is disposed so as to enter the cutout 41*a*. Consequently, the size of the apparatus in the X-axis direction is reduced.

In addition, in the present embodiment, the lower sensor unit 20B and the background-plate drive motor 39 overlap in the X-axis direction and the V-axis direction.

In addition, in this embodiment, the upper unit 4 includes a sub-board 43 provided with electronic components as illustrated in FIG. 8. Because the sub-board 43, when viewed from the width direction, is disposed in a region between a motor tangent line L5, which is a straight line parallel to the document transport path T and which is in contact with the separation-roller drive motor 40, and the separation roller tangent line L4, the size of the apparatus in the direction intersecting the document transport path T can be reduced.

In addition, because the sub-board 43, when viewed from the width direction, is provided in an orientation along the document transport path T, the size of the apparatus in a direction intersecting the document transport path T can be more effectively reduced.

It goes without saying that the present disclosure is not limited to the above embodiment, and various modifications are possible within the scope of the disclosure described in the claims, and they are also included in the scope of the present disclosure.

What is claimed is:

1. An image reading apparatus comprising:
    a document transport path along which a document is transported;
    a feeding roller that is provided on the document transport path and that feeds the document;
    a reader that is provided downstream of the feeding roller in the document transport path and that reads the document; and
    a main board that forms a controller that performs various controls of the image reading apparatus, wherein
    the main board on which electronic components are mounted, when viewed from a width direction, which is a direction intersecting a document transport direction, is disposed in a region between the document transport path and a feeding roller tangent line, which is a straight line parallel to the document transport path and which is in contact with the feeding roller at a position separated from the document transport path.

2. The image reading apparatus according to claim 1, wherein the main board is provided in an orientation along the document transport path.

3. The image reading apparatus according to claim 1, further comprising:
    a feeding-roller drive motor that is a power source of the feeding roller, wherein
    when viewed from the width direction, the feeding roller tangent line intersects the feeding-roller drive motor.

4. The image reading apparatus according to claim 3, further comprising:
    a first transfer roller pair that transfers the document fed by the feeding roller to a position facing the reader;
    a second transfer roller pair that is provided downstream of the reader in the document transport path and that transfers the document downstream along the document transport path; and
    a transfer-roller-pair drive motor that is a power source of the first transfer roller pair and the second transfer roller pair, wherein
    when viewed from the width direction, the feeding roller tangent line intersects the transfer-roller-pair drive motor.

5. The image reading apparatus according to claim 4, wherein the main board and the electronic components, when viewed from the width direction, are located in a region interposed between a first motor tangent line, which is a straight line parallel to the document transport path and which is in contact with the transfer-roller-pair drive motor, and a second motor tangent line, which is a straight line parallel to the document transport path and which is in contact with the transfer-roller-pair drive motor at a position farther from the document transport path than the first motor tangent line.

6. The image reading apparatus according to claim 5, wherein
the feeding-roller drive motor, when viewed from the width direction, is located in the region interposed between the first motor tangent line and the second motor tangent line.

7. The image reading apparatus according to claim 6, further comprising:
a background plate that is provided at a position facing the reader and that is configured to switch between a facing state of facing the reader and a non-facing state of not facing the reader; and
a background-plate drive motor that is a power source that switches the state of the background plate, wherein
the background-plate drive motor, when viewed from the width direction, is located in the region interposed between the first motor tangent line and the second motor tangent line.

8. The image reading apparatus according to claim 1, wherein
the document transport path is formed between a first unit, which includes the feeding roller and the main board, and a second unit, which is disposed so as to face the first unit,
the first unit is pivotally supported by a support portion located below the first unit when viewed from the width direction,
a casing, which forms an outer shell of the first unit, includes an arch portion along a pivot locus of the first unit at a position facing the support portion, and
the main board is disposed in a space formed inside the arch portion.

9. The image reading apparatus according to claim 8, wherein
the main board is configured such that an electronic component having the largest amount of protrusion among the electronic components protruding in the direction intersecting the document transport path is disposed so as to face the arch portion.

10. The image reading apparatus according to claim 1, further comprising:
a separation roller that performs nipping and separation of the document between the separation roller and the feeding roller; and
a separation-roller drive motor, which is a power source of the separation roller, wherein
when viewed from the width direction, a separation roller tangent line, which is a straight line parallel to the document transport path and which is in contact with the separation roller at a position separated from the document transport path, intersects the separation-roller drive motor.

11. An image reading apparatus comprising:
a document transport path along which a document is transported;
a feeding roller that is provided on the document transport path and feeds the document;
a first pair of transport rollers that is provided at a downstream side of the feeding roller and transports the document transported by the feeding roller;
a reader that is provided at a downstream side of the first pair of transport rollers and reads the document transported by the first pair of transport rollers;
a second pair of transport rollers that is provided at a downstream side of the reader and transports the document read by the reader; and
a main board that forms a controller that performs various controls of the image reading apparatus, wherein
the main board on which electronic components are mounted, when viewed from a width direction, which is a direction intersecting a document transport direction, is disposed in a region between a line, which is a straight line passing through a nip point at which the first pair of transport rollers nips the document and a nip point at which the second pair of transport rollers nips the document, and a feeding roller tangent line which is a straight line parallel to the line and is in contact with the feeding roller.

12. The image reading apparatus according to claim 11, further comprising:
a feeding-roller drive motor that is a power source of the feeding roller, wherein
when viewed from the width direction, the feeding roller tangent line intersects the feeding-roller drive motor.

13. An image reading apparatus comprising:
a document transport path along which a document is transported;
a feeding roller that is provided on the document transport path and that feeds the document;
a separation roller that nips and separates the document between the separation roller and the feeding roller
a first pair of transport rollers that is provided at a downstream side of the feeding roller and transports the document transported by the feeding roller;
a reader that is provided at a downstream side of the first pair of transport rollers and that reads the document transported by the first pair of transport rollers;
a main board that forms a controller that performs various controls of the image reading apparatus, wherein
the main board on which electronic components are mounted, when viewed from a width direction, which is a direction intersecting a document transport direction, is disposed in a region between a line, which is a straight line passing through a nip point at which the feeding roller and the separate roller nip the document and a nip point at which the first pair of transport rollers nips the document, and a feeding roller tangent line which is a straight line parallel to the line and is in contact with the feeding roller.

14. The image reading apparatus according to claim 11, wherein the main board is provided in an orientation along the line.

15. The image reading apparatus according to claim 13, wherein the main board is provided in an orientation along the line.

16. The image reading apparatus according to claim 13, further comprising:
a feeding-roller drive motor that is a power source of the feeding roller, wherein
when viewed from the width direction, the feeding roller tangent line intersects the feeding-roller drive motor.

* * * * *